United States Patent
Albu

(10) Patent No.: US 8,493,460 B2
(45) Date of Patent: *Jul. 23, 2013

(54) REGISTRATION OF DIFFERENTLY SCALED IMAGES

(75) Inventor: Felix Albu, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,146

(22) Filed: Sep. 15, 2011

(65) Prior Publication Data

US 2013/0070126 A1    Mar. 21, 2013

(51) Int. Cl.
*H04N 5/225* (2006.01)
*H04N 9/093* (2006.01)
*H04N 5/217* (2011.01)

(52) U.S. Cl.
USPC ........ 348/218.1; 348/241; 348/263; 382/275; 382/284; 382/294

(58) Field of Classification Search
USPC .................. 348/218.1; 382/275, 284, 294
See application file for complete search history.

(56) References Cited

U.S. PATENT DOCUMENTS

| | | | |
|---|---|---|---|
| 6,407,777 B1 | 6/2002 | DeLuca | |
| 6,750,903 B1 * | 6/2004 | Miyatake et al. | 348/218.1 |
| 6,859,565 B2 | 2/2005 | Baron | |
| 7,027,662 B2 | 4/2006 | Baron | |
| 7,317,815 B2 | 1/2008 | Steinberg et al. | |
| 7,352,394 B1 | 4/2008 | DeLuca et al. | |
| 7,362,368 B2 | 4/2008 | Steinberg et al. | |
| 7,457,477 B2 | 11/2008 | Petschnigg et al. | |
| 7,474,341 B2 | 1/2009 | DeLuca et al. | |
| 7,583,297 B2 | 9/2009 | Yamada | |
| 7,606,417 B2 | 10/2009 | Steinberg et al. | |
| 7,609,850 B2 * | 10/2009 | Tapson | 382/100 |
| 7,634,109 B2 | 12/2009 | Steinberg et al. | |
| 7,636,486 B2 | 12/2009 | Steinberg et al. | |
| 7,639,888 B2 | 12/2009 | Steinberg et al. | |
| 7,639,889 B2 | 12/2009 | Steinberg et al. | |
| 7,660,478 B2 | 2/2010 | Steinberg et al. | |
| 7,676,108 B2 | 3/2010 | Steinberg et al. | |
| 7,680,342 B2 | 3/2010 | Steinberg et al. | |
| 7,687,778 B2 | 3/2010 | Wang et al. | |

(Continued)

OTHER PUBLICATIONS

Qing Chen, Nicolas D. Georganas, Emil M. Petriu, Real-time Vision-based Hand Gesture Recognition Using Haar-like Features, Instrumentation and Measurement Technology Conference Proceedings, IMTC 2007. IEEE, pp. 1-6, Warsaw, Poland, May 1-3, 2007.

Sauer, K.; Schwartz, B.; Efficient block motion estimation using integral projections, IEEE Transactions on Circuits and Systems for Video Technology, Oct. 1996, Vol. 6, Issue: 5, pp. 513-518, ISSN: 1051-8215, INSPEC Accession No. 5403546, doi: 10.1109/76.538933.

(Continued)

*Primary Examiner* — Roberto Velez
*Assistant Examiner* — Quan Pham
(74) *Attorney, Agent, or Firm* — Andrew V. Smith

(57) ABSTRACT

An image registration method involves computing horizontal and vertical integral projection vectors for first and second distorted or partially distorted images. The images are registered by applying a scale factor estimation between the first and second images on the horizontal and vertical integral projection vectors.

21 Claims, 7 Drawing Sheets

U.S. PATENT DOCUMENTS

| | | | |
|---|---|---|---|
| 7,692,696 | B2 | 4/2010 | Steinberg et al. |
| 7,697,778 | B2 | 4/2010 | Steinberg et al. |
| 7,738,015 | B2 | 6/2010 | Steinberg et al. |
| 7,746,385 | B2 | 6/2010 | Steinberg et al. |
| 7,773,118 | B2 | 8/2010 | Florea et al. |
| 7,787,022 | B2 | 8/2010 | Steinberg et al. |
| 7,796,822 | B2 | 9/2010 | Steinberg et al. |
| 7,868,922 | B2 | 1/2011 | Ciuc et al. |
| 7,974,529 | B2 | 7/2011 | Koguchi et al. |
| 8,194,993 | B1 * | 6/2012 | Chen et al. ............ 382/254 |
| 2004/0233461 | A1 * | 11/2004 | Armstrong et al. ......... 356/620 |
| 2005/0166054 | A1 * | 7/2005 | Fujimoto ............ 713/176 |
| 2007/0172150 | A1 * | 7/2007 | Quan et al. ............ 382/298 |
| 2007/0269108 | A1 | 11/2007 | Steinberg et al. |
| 2007/0296833 | A1 | 12/2007 | Corcoran et al. |
| 2008/0043121 | A1 | 2/2008 | Prilutsky et al. |
| 2008/0112599 | A1 | 5/2008 | Nanu et al. |
| 2008/0143854 | A1 | 6/2008 | Steinberg et al. |
| 2008/0219581 | A1 | 9/2008 | Albu et al. |
| 2008/0309769 | A1 | 12/2008 | Albu et al. |
| 2008/0309770 | A1 | 12/2008 | Florea et al. |
| 2008/0316328 | A1 | 12/2008 | Steinberg et al. |
| 2008/0317379 | A1 | 12/2008 | Steinberg et al. |
| 2009/0002514 | A1 | 1/2009 | Steinberg et al. |
| 2009/0003661 | A1 | 1/2009 | Ionita et al. |
| 2009/0003708 | A1 | 1/2009 | Steinberg et al. |
| 2009/0080713 | A1 | 3/2009 | Bigioi et al. |
| 2009/0080796 | A1 | 3/2009 | Capata et al. |
| 2009/0115915 | A1 | 5/2009 | Steinberg et al. |
| 2009/0167893 | A1 | 7/2009 | Susanu et al. |
| 2009/0179998 | A1 | 7/2009 | Steinberg et al. |
| 2009/0179999 | A1 | 7/2009 | Albu et al. |
| 2009/0189998 | A1 | 7/2009 | Nanu et al. |
| 2009/0196466 | A1 | 8/2009 | Capata et al. |
| 2009/0273685 | A1 | 11/2009 | Ciuc et al. |
| 2009/0303342 | A1 | 12/2009 | Corcoran et al. |
| 2009/0303343 | A1 | 12/2009 | Drimbarean et al. |
| 2010/0039520 | A1 | 2/2010 | Nanu et al. |
| 2010/0039525 | A1 | 2/2010 | Steinberg et al. |
| 2010/0166300 | A1 * | 7/2010 | Spampinato et al. ......... 382/162 |
| 2010/0329582 | A1 | 12/2010 | Albu et al. |
| 2011/0002545 | A1 | 1/2011 | Steinberg et al. |
| 2011/0013044 | A1 | 1/2011 | Steinberg et al. |
| 2011/0043648 | A1 | 2/2011 | Albu et al. |
| 2011/0050919 | A1 | 3/2011 | Albu et al. |
| 2011/0085049 | A1 * | 4/2011 | Dolgin et al. ............. 348/208.4 |
| 2011/0102638 | A1 | 5/2011 | Susanu et al. |
| 2011/0141226 | A1 | 6/2011 | Stec et al. |
| 2011/0141227 | A1 | 6/2011 | Bigioi et al. |
| 2011/0205381 | A1 | 8/2011 | Vranceanu et al. |
| 2011/0216156 | A1 | 9/2011 | Bigioi et al. |

OTHER PUBLICATIONS

Fawaz Hjouj and David W. Kammler, Identification of Reflected, Scaled, Translated, and Rotated Objects from their Radon Projections, IEEE Trans. on Image Processing, vol. 17, No. 3, Mar. 2008, pp. 301-310.

Athanasios Bismpigiannis, "Measurements and correction of geometric distortion", Stanford University, EE 362 / PSYCH 221, Applied Vision and Imaging Systems, Winter 2007, 22 Pages. Retrieved from the Internet on Sep. 11, 2011, URL: http://scien.stanford.edu/pages/labsite/2007/psych221/projects/07/geometric_distortion/geometric_distortion_project.pdf.

Abhishek Das and Dinesh Patil, "Efficient Measurement and Correction Techniques for Lens Distortion", Stanford, EE362 Final project, 2006, 18 Pages. Retrieved from the Internet on Sep. 11, 2011, URL: http://scien.stanford.edu/pages/labsite/2006/psych221/projects/06/ddpatil/ee362ProjectReport.pdf.

Harri Ojanen, "Automatic Correction of Lens Distortion by Using Digital Image Processing", Jul. 10, 1999, 6 Pages. Retrieved from the Internet on Sep. 11, 2011, URL: http://www.math.rutgers.edu/~ojanen/undistort/undistort.pdf.

Imatest Software. Retrieved from the Internet on Sep. 11, 2011, URL: http://www.imatest.com/docs/distortion.html, 14 pages.

Istvan Andorko, Peter M. Corcoran, and Petronel Bigioi, FPGA Based Stereo Imaging System with Applications in Computer Gaming, at International IEEE Consumer Electronics Society's Games Innovations Conference 2009 (ICE-GIC 09), London, UK. Aug. 25-28, 2009. pp. 239-245. ISBN: 978-1-4244-4459-5. DOI: 10.1109/ICEGIC.2009.5293586.

Co-pending U.S. Appl. No. 12/944,703, filed Nov. 11, 2010.
Co-pending U.S. Appl. No. 12/959,320, filed Dec. 2, 2010.
Co-pending U.S. Appl. No. 13/020,805, filed Feb. 3, 2011.
Co-pending U.S. Appl. No. 13/028,203, filed Feb. 15, 2011.
Co-pending U.S. Appl. No. 13/028,205, filed Feb. 15, 2011.
Co-pending U.S. Appl. No. 13/028,206, filed Feb. 15, 2011.
Co-pending U.S. Appl. No. 13/077,891, filed Mar. 31, 2011.
Co-pending U.S. Appl. No. 13/077,936, filed Mar. 21, 2011.
Co-pending U.S. Appl. No. 13/078,970, filed Apr. 2, 2011.
Co-pending U.S. Appl. No. 13/084,340, filed Feb. 15, 2011.
Co-pending U.S. Appl. No. 12/944,701, filed Nov. 11, 2010.

* cited by examiner

Original

Zoom 1.1

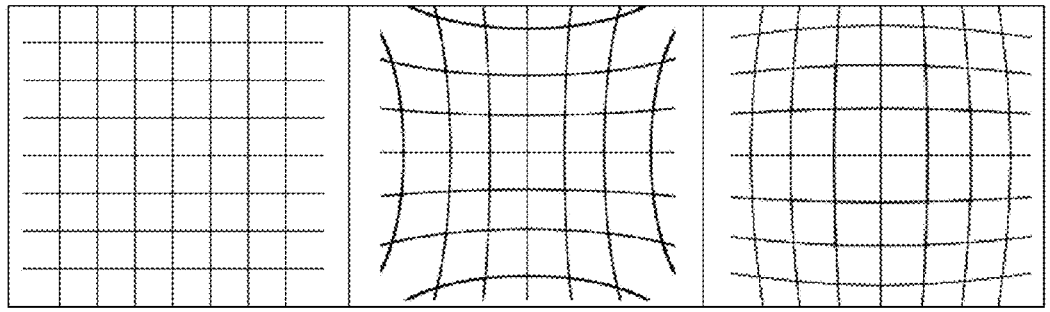
original lines
Figure 5A
pin-cushion distorted lines
(radial parameter 0.3)
Figure 5B
barrel distorted lines
(radial parameter 0.1)
Figure 5C
pin-cushion distorted image
(radial parameter 0.3)
Figure 6A
barrel distorted image
(radial parameter 0.4)
Figure 6B

REGISTRATION OF DIFFERENTLY SCALED IMAGES

RELATED APPLICATIONS

This application is related to a contemporaneously filed application, Registration of Distorted Images, with same inventor and assignee, having Ser. No. 13/234,139.

BACKGROUND

The invention relates to image registration, and particularly to registration of distorted, rotated, translated and/or differently scaled images.

U.S. patent application Ser. No. 12/959,089, filed Dec. 2, 2010, by the same assignee describes an image acquisition device having a wide field of view that includes a lens and image sensor configured to capture an original wide field of view (WFoV) image with a field of view of more than 90°. The device has an object detection engine that includes one or more cascades of object classifiers, e.g., face classifiers. A WFoV correction engine may apply rectilinear and/or cylindrical projections to pixels of the WFoV image, and/or non-linear, rectilinear and/or cylindrical lens elements or lens portions serve to prevent and/or correct distortion within the original WFoV image. One or more objects located within the original and/or distortion-corrected WFoV image is/are detectable by the object detection engine upon application of the one or more cascades of object classifiers.

U.S. patent application Ser. No. 13/028,203, filed Feb. 15, 2011, by the same assignee describes a technique to determine a measure of frame-to-frame rotation for a sequence of two or more images. A global XY alignment of a pair of frames is performed. Local XY alignments in at least two matching corner regions of the pair of images are determined after the global XY alignment. Based on differences between the local XY alignments, a global rotation is determined between the pair of frames.

U.S. patent application Ser. No. 13/020,805, filed Feb. 3, 2011, by the same assignee describes an autofocus method that includes acquiring multiple images each having a camera lens focused at a different focus distance. A sharpest image is determined among the multiple images. Horizontal, vertical and/or diagonal integral projection (IP) vectors are computed for each of the multiple images. One or more IP vectors of the sharpest image is/are convoluted with multiple filters of different lengths to generate one or more filtered IP vectors for the sharpest image. Differences are computed between the one or more filtered IP vectors of the sharpest image and one or more IP vectors of at least one of the other images of the multiple images. At least one blur width is estimated between the sharpest image and the at least one of the other images of the multiple images as a minimum value among the computed differences over a selected range. The steps are repeated one or more times to obtain a sequence of estimated blur width values. A focus position is adjusted based on the sequence of estimated blur width values.

U.S. patent application Ser. No. 13/077,891, filed Mar. 31, 2011, by the same assignee describes a technique of enhancing a scene containing one or more off-center peripheral regions within an initial distorted image captured with a large field of view. The technique includes determining and extracting an off-center region of interest (hereinafter "ROI") within the image. Geometric correction is applied to reconstruct the off-center ROI into a rectangular or otherwise undistorted or less distorted frame of reference as a reconstructed ROI. A quality of reconstructed pixels is determined within the reconstructed ROI. Image analysis is selectively applied to the reconstructed ROI based on the quality of the reconstructed pixels.

U.S. patent application Ser. No. 13/078,970, filed Apr. 2, 2011, by the same assignee describes a technique of enhancing a scene containing one or more off-center peripheral regions within an initial distorted image captured with a large field of view. The technique includes determining and extracting an off-center region of interest (hereinafter "ROI") within the image. Geometric correction is applied to reconstruct the off-center ROI into a rectangular or otherwise undistorted or less distorted frame of reference as a reconstructed ROI.

U.S. patent application Ser. No. 13/084,340, filed Feb. 15, 2011, by the same assignee describes a technique of enhancing a scene containing one or more off-center peripheral regions within an initial distorted image captured with a large field of view. The technique includes determining and extracting an off-center region of interest (hereinafter "ROI") within the image. Geometric correction is applied to reconstruct the off-center ROI into a rectangular or otherwise undistorted or less distorted frame of reference as a reconstructed ROI. A quality of reconstructed pixels is determined within the reconstructed ROI. One or more additional initially distorted images is/are acquired, and matching additional ROIs are extracted and reconstructed to combine with reduced quality pixels of the first reconstructed ROI using a super-resolution technique to provide one or more enhanced ROIs.

Each of these patent applications is hereby incorporated by reference into the detailed description as describing alternative embodiments and techniques that may be used in combination with one or more features of embodiments described herein.

BRIEF DESCRIPTION OF THE DRAWINGS

FIGS. 5a, 5b and 5c illustrate respectively original lines and pin-cushion and barrel distorted lines.

FIGS. 6a and 6b illustrate respectively pin-cushion and barrel distorted images.

DETAILED DESCRIPTIONS OF THE EMBODIMENTS

Figure 1A:
FIG. 1a illustrates an original grayscale image.

An image registration method is provided that includes acquiring first and second distorted or partially distorted images of scenes that each include a first object, such as a face. Horizontal and vertical integral projection vectors are computed for the first and second distorted or partially distorted images. At least an approximation of an inverse distortion function is applied to the horizontal and vertical integral projection vectors of the first and second distorted or partially distorted images to generate distorted horizontal and vertical integral projection vectors. The method further includes registering the first and second distorted or partially distorted images are registered, including applying a displacement, rotation or scale factor estimation between the first and second images on the distorted horizontal and vertical integral projection vectors. A further action is performed using the registered first and second distorted or partially distorted images.

The registering of the first and second distorted or partially distorted images may be performed with or without correcting distortion in the first and second distorted or partially distorted images.

The computing of the horizontal and vertical integral projection vectors for the first and second distorted or partially distorted images may include summing columns and rows of image data, respectively.

A distortion function may be determined for at least a portion of the first or the second distorted or partially distorted image, or both. A model function may be found that approximately fits the distortion of at least the portion of the first or second distorted or partially distorted image, or both. The distortion function determined for at least the portion of the first or second distorted or partially distorted image, or both, may include: $1+k_1 r$; or $[1+k_1 r]^{-1}$; or $1+k_1 r^2$; or $[1+k_1 r^2]^{-1}$; or $1+k_1 r+k_2 r^2$; or $(1+k_1 r)/(1+k_2 r^2)$; or combinations thereof, any of various other model functions, e.g., as may be understood by lens designers and other optical manufacturers and experts.

The registering may include applying a scale factor estimation that involves:
resampling at least a portion of the first distorted or partially distorted image with multiple different resampling factors over a range of resampling factors to generate multiple resampled integral projection vectors;
computing for each of the different resampling factors an absolute sum of differences between the resampled integral projection vectors of the first image and corresponding integral projection vectors of the second image; and
determining the scaling factor between the first and second distorted or partially distorted images, including finding the resampling factor that corresponds to the minimum value of the absolute sums over the range of resampling factors.

Another image registration method includes acquiring first and second distorted or partially distorted images of scenes that each include a first object, e.g., a face. Horizontal and vertical integral projection vectors are computed for the first and second distorted or partially distorted images or distortion-corrected images, or both. The method further includes registering the first and second distorted or partially distorted images, or the distortion-corrected images, or both, including applying a scale factor estimation between the first and second images on the horizontal and vertical integral projection vectors. A further action is performed using the registered first and second distorted or partially distorted images or the corrected images, or both.

The method may include correcting distortion in the first and second distorted or partially distorted images prior to computing the horizontal or vertical integral projection vectors. The computing of the horizontal and vertical integral projection vectors may involve summing columns and rows of image data, respectively.

A distortion function may be determined for at least a portion of the first or second distorted or partially distorted image, or both, to compute the distortion-corrected images or to compute distorted integral projection vectors, or both. The determining of the distortion function may involve finding a model function that approximately fits the distortion of at least the portion of the first or second distorted or partially distorted image, or both. The distortion function determined for at least the portion of the first or second distorted or partially distorted image, or both, may include: $1+k_1 r$; or $[1+k_1 r]^{-1}$; or $1+k_1 r^2$; or $[1+k_1 r^2]^{-1}$; or $1+k_1 r+k_2 r^2$; or $(1+k_1 r)/(1+k_2 r^2)$; or combinations thereof, any of various other model functions, e.g., as may be understood by lens designers and other optical manufacturers and experts.

The applying of the scale factor estimation may include:
resampling at least a portion of the first distorted or partially distorted image with multiple different resampling factors over a range of resampling factors to generate multiple resampled integral projection vectors;
computing for each of the different resampling factors an absolute sum of differences between the resampled integral projection vectors of the first image and corresponding integral projection vectors of the second image; and
determining the scaling factor between the first and second distorted or partially distorted images, including finding the resampling factor that corresponds to the minimum value of the absolute sums over the range of resampling factors.

One or more processor-readable storage devices are also provided that have code embedded therein for programming one or more processors to perform any of the methods described herein. Digital image acquisition devices, such as portable cameras and camera-phones, are also provided each include a lens, an image sensor, a processor and a memory that has code embedded therein for programming the processor to perform any of the methods described herein.

Scale Estimation Method

In certain embodiments, horizontal and vertical integral projection vectors are computed for a pair of images. The integral projection (IP) vectors of one image are resampled with different resampling factors. The absolute sum of the difference between the resampled IP vectors of the one image and the IP vectors of the other image is computed on a common part, e.g., a central part. The sum of squares may alternatively be used. The resampling factor that leads to the minimum value over the selected range estimates the scaling factor between images.

In certain embodiments, a scaling factor or zoom factor is estimated between the two images or image crops (grayscale, or other color planes). It may be approximated that both images are not blurred and that there is no rotation nor translation between them, or that these are otherwise compensated. The horizontal and vertical integral projection vectors (i.e. the sums of columns and rows respectively) are computed for both images. The integral projection vector of one image is resampled with different resampling factors.

In certain embodiments, the resampling changes the sampling rate at a resampling factor multiple, e.g., using a polyphase implementation. The common and/or central part of the resampled vectors is selected. The absolute sum of the difference between the resampled IP vectors of one image and the IP vector of the other image is computed on the common and/or central part. The resampling factor that leads to the minimum value over the selected range estimates the zoom or scaling factor between images. The sum of absolute differences can be replaced by the sum of squared differences.

In certain embodiments, for high accuracy, both horizontal and vertical projections profiles can be used, particularly when a same scale factor is used on horizontal and vertical directions. In this case, the minimum of the sum of both horizontal and vertical sums of absolute differences may be selected to indicate the suitable scaling factor. In other embodiments, different scaling factors may be used for the horizontal and vertical directions.

In certain embodiments, an extension of a translational displacement method may use integral projection methods. In cases of significant rotation and/or radial blur (e.g., in video stabilization or panorama applications), a search of the scaling factor can follow after a translational displacement compensation and/or rotation compensation. A high frequency content change of integral projection vectors from one frame to another can indicate shaky videos with significant rotations.

In the autofocus case, blur estimation may follow zoom estimation, without applying translational registration. A problem encountered in autofocus systems is that focal changes occur during the acquisition of the images. After estimating the zoom between them, the blur radius can be estimated (see, e.g., U.S. Ser. No. 13/028,206, assigned to the same assignee and incorporated by reference). In this embodiment, the blur estimation is more exact than in the case without estimating the zoom.

The procedure can be performed on both horizontal and vertical projection vectors or by splitting both in opposite directions from their centre. The complexity of the method may be greatly reduced, because multiple image re-scaling or complex image transforms like radon transforms would not be involved in these embodiments. Also, the technique may be extended to transformed image domains. The estimation of the scaling factor using resampled integral projection vectors of one image and their comparison with the integral projection vectors of the other image provides an advantageous and effective image registration solution.

Techniques in accordance with certain embodiments involve estimating a scaling factor or zoom factor between two images or image crops (grayscale, or other color planes etc.). In some approximations, it may be assumed that both images are not blurred and there is no rotation or translation between them, or that these factors have been or will be otherwise compensated. The horizontal and vertical integral projection vectors (see, e.g., K. Sauer and B. Schwartz, 1996, "Efficient Block Motion Estimation Using Integral Projections", IEEE Trans. Circuits, Systems for video Tech., vol. 6, No. 5, October, pp. 513-518, incorporated by reference) may be found for both images by computing the sums of all columns and rows respectively. The integral projection vector of one image is then resampled in certain embodiments with different resampling factors. In some embodiments, the resampling changes the sampling rate by multiplying the resampling factor using, for example, a polyphase implementation (see, e.g., http://www.mathworks.com/help/toolbox/signal/resample.html, incorporated by reference).

A common part, e.g., a central part, of the resampled vectors is selected. The absolute sum of the difference between the resampled IP vectors of one image and the IP vector of the other image is computed on this common and/or central part. The resampling factor that leads to the minimum value over the selected range estimates the zoom or scaling factor between images. The sum of absolute differences can be replaced by the sum of squared differences. Also, for better accuracy, both horizontal and vertical projections profiles can be used if identical scale factor is used on horizontal and vertical directions. In this case, the minimum of the sum of both horizontal and vertical sums of absolute differences indicates the suitable scaling factor. The proposed method can be used in order to find different scaling factors on horizontal and vertical directions.

Figure 1B:
FIG. 1b illustrates the grayscale image of FIG. 1a with application of 1.1× zoom.
Figure 2:
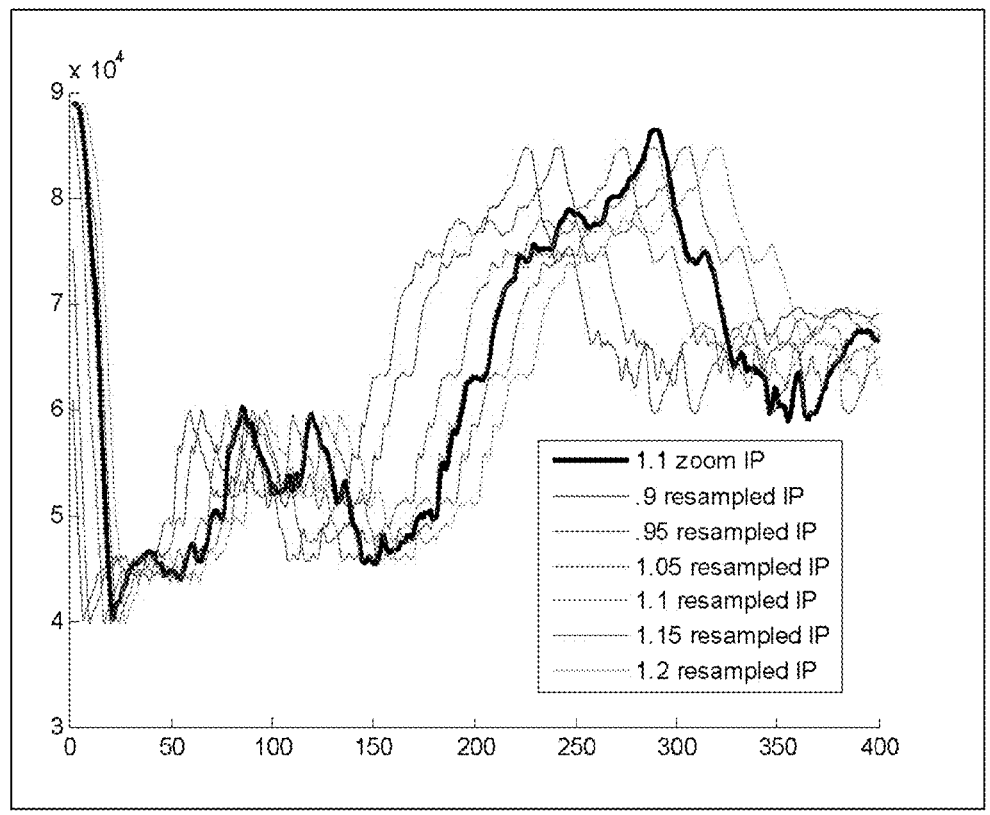
FIG. 2 shows plots of integral projection vectors of the 1.1× zoom image, and of six resampled integral projection vectors at various zoom factors.
Figure 3A:
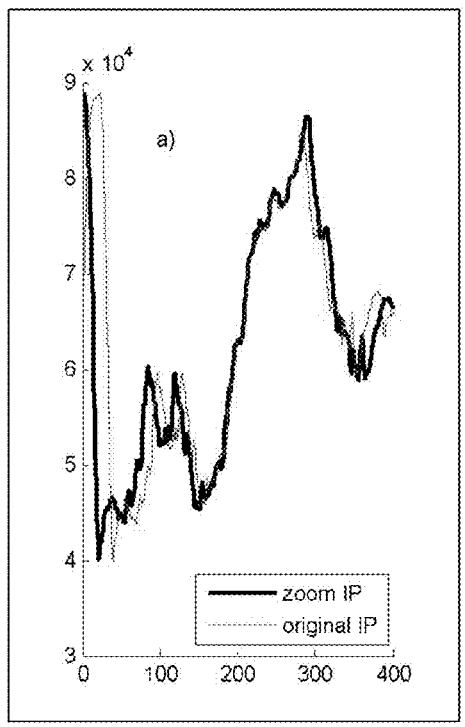
FIG. 3a shows plots of integral projection vectors of the images of FIGS. 1a and 1b obtained by summing their columns.

FIGS. 1a-1b illustrate an example of a pair of grayscale images offset by a scaling factor or zoom factor of 1.1 to 1. FIG. 2 shows plots of integral projection vectors of the 1.1× zoom image, and of six resampled integral projection vectors at various zoom factors. The resampling factors are varied from 0.9 to 1.2 with a 0.05 step. Resampling with a factor 1 is not shown since it doesn't affect the signal and represent the original IP vector (FIG. 3a). Therefore six (6) different integral projection vectors (plots of differently colors in FIG. 2) are obtained and compared with the integral projection vector of the second image (solid black line plot in FIG. 2).

Figure 3B:
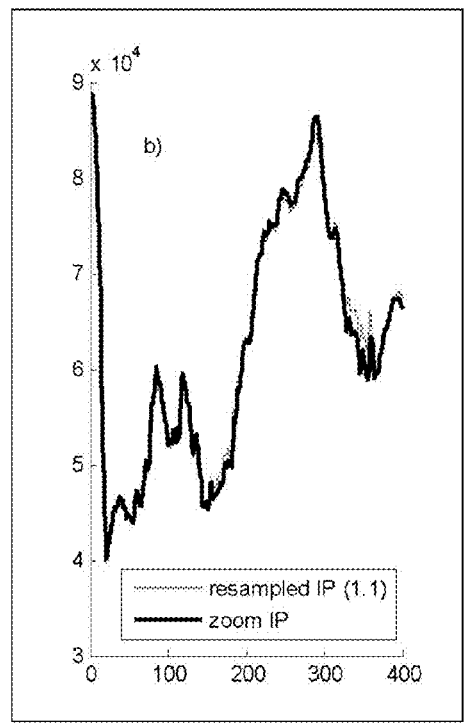
FIG. 3b shows plots of integral projection vectors of the image of FIG. 1b, and of resampled integral projection vectors at 1.1× zoom.

FIG. 3a shows the integral projection vectors of both images obtained by summing their columns. FIG. 3a illustrates that the central part of the IP vectors is better matched than the laterals parts. Also, differences increase towards the extremes of the vectors. FIG. 3b shows the central zoomed IP vector and the re-sampled original IP vector with a scaling factor 1.1. These represent the best match from FIG. 2.

Figure 4:
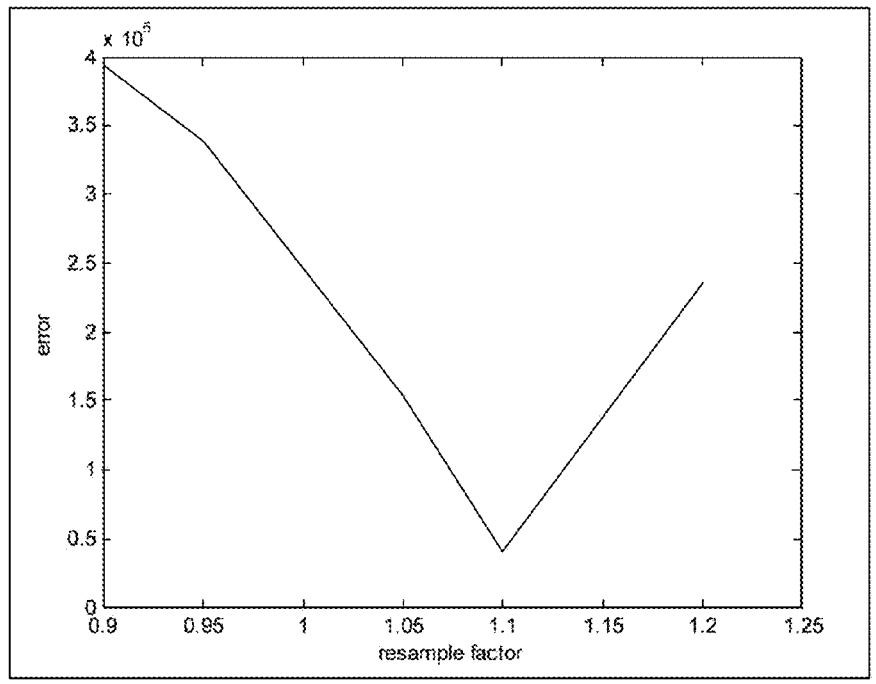
FIG. 4 shows a plot of absolute difference between resampled integral projection vectors of one image and the integral projection vectors of a second image as a function of the scale (zoom) or resample factor.

FIG. 4 confirms that the minimum corresponds to the chosen scaling factor of 1.1×. In FIG. 4, the sums of absolute differences between the resampled integral projection vectors of one image and the integral projection vectors of the second image are plotted as a function of the scale/resample factor. The minimum clearly appears at scale factor 1.1.

In certain embodiments, extensions of translational displacement methods may be used that employ integral projection methods. Therefore, U.S. patent application Ser. Nos. 12/959,089, filed Dec. 2, 2010, 13/028,203, filed Feb. 15, 2011, 13/020,805, filed Feb. 3, 2011, 13/077,891, filed Mar. 31, 2011, 13/078,970, filed Apr. 2, 2011, 13/084,340, filed Feb. 15, 2011, which are each assigned to the same assignee as the present application are hereby incorporated by reference.

In cases of significant rotation and/or radial blur, video stabilization and/or panorama applications may be employed. Therefore, U.S. Pat. Nos. 7,639,888, and 7,773,118 and US published applications US20070296833, US20080309769, US20080309770, US20090167893, US20080219581, US20100329582, US20090179999, US20090080796, US20090303343, US 20110205381, US20110141227, and US20110141226, which are assigned to the same assignee as the present application are hereby incorporated by reference.

The search for the scaling factor can follow after the translational displacement compensation and/or rotation compensation. The high frequency content change of the integral projection vectors from one frame to another can indicate shaky videos with significant rotations (see U.S. Pat. No. 7,868,922, incorporated by reference).

In applying embodiments in the context of autofocus techniques, blur estimation can follow after zoom estimation, because there is no need for translational registration. A problem encountered in autofocus systems involves focal changes during the acquisition of images needed for focusing. In the auto-focus context, U.S. patent application Ser. Nos. 12/959, 320, filed Dec. 2, 2010, 12/944, 701, filed Nov. 11, 2010, 13/020,805, filed Feb. 3, 2011 and 13/077,936, filed Mar. 21, 2011 are assigned to the same assignee as the present application and are hereby incorporated by reference. After estimating the zoom between them, the blur radius can be estimated using the integral projection-based method described in U.S. Ser. No. 13/028,205, filed Feb. 15, 2011, which is hereby incorporated by reference. Blur estimation in accordance with this embodiment is advantageously precise.

The procedure is performed in certain embodiments on both horizontal and vertical projection vectors, and in other embodiments by splitting both in opposite directions from their centre. The complexity of the method is somewhat reduced in the latter case, because it doesn't involve multiple image re-scaling nor complex image transforms like radon transforms (see, e.g., Fawaz Hjouj and David W. Kammler, "Identification of Reflected, Scaled, Translated, and Rotated Objects from their Radon Projections", IEEE Trans. On Image Processing, vol. 17, no. 3, March 2008, pp. 301-310, incorporated by reference). Also, the process is extendible to transformed image domains.

Distorted Integral Projection Method

A distorted integral projection method for registration of distorted images is provided and several embodiments are described herein. After the function that models the distortion of the images is found, the approximation of its inverse is computed. This function is applied to the integral projection vectors of the distorted images. These computed distorted integral projection vectors are used for the registration of the distorted images.

Images can be distorted in various ways, although common distortions involve pincushion distortions, barrel distortions and fish-eye distortions. Advantageous integral projection (IP) techniques are applicable to images having these kinds of distortions. Useful methods in image registration are provided in certain embodiments between images. Some of these embodiments relate to image pairs having horizontal and vertical displacements, rotation, blur size and/or scaling factor differences. Certain embodiments provide approaches to working with distorted images that utilize integral projection techniques that are also applicable to undistorted images, particularly once the distorted integral projection vectors are found in as described herein.

Since the integral projection method sums the pixel values of columns or rows, or both, the integral projection vectors would not be as precise as desired in applications to distorted images without use of the techniques described by example in accordance with certain embodiments. The effect of the distortion on the integral projection vectors is advantageously reduced by applying on them an approximation of the inverse function that models the distortion of the original image. Translation displacements, rotation estimation and/or scale factor estimations between two images are applied to distorted integral projection vectors to provide advantageously high precision. Better registration between corrected images is obtained by using the available distorted images. The use of distorted integral projection vectors improves the precision of computing the registration parameters without the need to correct the distorted images first.

FIGS. 5a-5c illustrate examples of distortion effects on lines. FIG. 5a illustrates an example of an original image. FIG. 5b illustrates the lines of the original image subjected to a pincushion distortion, while FIG. 5c illustrates a barrel distortion. The effect on real images of the same pincushion and barrel distortions is illustrated in FIGS. 6a-6b. These are radial distortions depending on the distance r, and a radial parameter, k.

Examples of such polynomial and rational distortion functions are shown in Table 1.

TABLE 1

| Polynomial and rational distortion functions | | | | | |
| --- | --- | --- | --- | --- | --- |
| $1+k_1r$ | $\frac{1}{1+k_1r}$ | $1+k_1r^2$ | $\frac{1}{1+k_1r^2}$ | $1+k_1r+k_2r^2$ | $\frac{1+k_1r}{1+k_2r^2}$ |

The effect of the distortion on the integral projection vectors can be reduced by applying on them an approximation of the inverse function ($F^{-1}(r)$), where $F(r)$ is the function that models the distortion of the original image. The radius r is actually approximated with its projection on axis. This approximation would not be valid in cases of heavy radial distortions (high k coefficients in case of polynomial and rational distortion functions).

Figure 7:
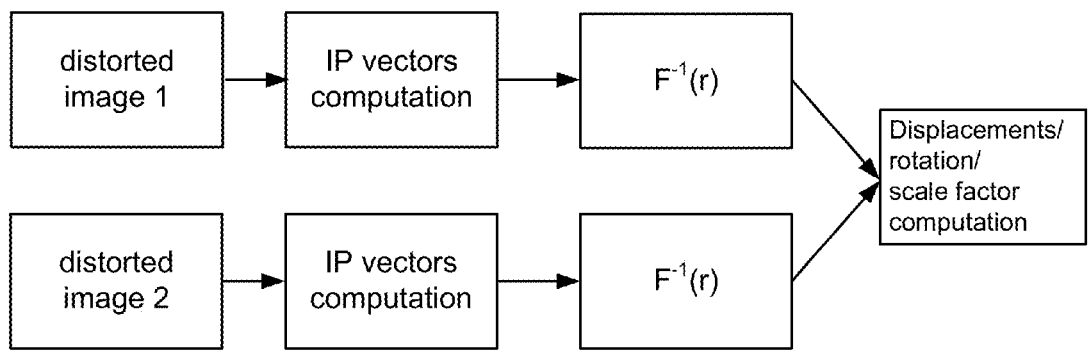
FIG. 7 illustrates a technique that determines distorted integral projection vector for two images with which displacements, rotations, and/or scale factor determinations can be performed on uncorrected, distorted images.

FIG. 7 is a block diagram illustrating processes generally involved in a technique in accordance with these embodiments. The illustrative process of FIG. 7 begins with a pair of distorted images 1 and 2. Integral projection vectors are computed for these images 1 and 2. One or more approximate inverse functions are applied to the computed integral projection vectors. Now, techniques for translation displacements, rotation estimation and/or scale factor estimations between the two images 1 and 2 can be applied on these distorted integral projection vectors. This method provides advantageous precision with regard to computing registration parameters without the need to correct the distorted images first.

The computation of k coefficient/coefficients may in certain embodiments be made by using calibration grids (see, e.g., Athanasios Bismpigiannis, "Measurements and correction of geometric distortion", Stanford, 2007, http://scien.stanford.edu/pages/labsite/2007/psych221/projects/07/geometric_distortion/geometric_distortion_project.pdf; and Abhishek Das, Dinesh Patil, "Efficient Measurement and Correction Techniques for Lens Distortion", Stanford, 2006, http://scien.stanford.edu/pages/labsite/2006/psych221/ projects/06/ddpatil/ee362ProjectReport.pdf; and Harri Ojanen, "Automatic Correction of Lens Distortion by Using Digital Image Processing", 1999, http://www.math.rutgers.edu/~ojanen/undistort/undistort.pdf, which are each incorporated by reference. Also, commercial software like Imatest can be used (see, e.g., Imatest software, http://www.imatest.com/docs/distortion.html, which is incorporated by reference. After a good model for the distortion is found, the approximation of the inverse function is computed analytically or by using specialized mathematical software like MAPLE or MATLAB. The inverse function approximation should minimize the error preferably on the range [1 . . . min{Nl/2, Nc/2}], where Nl and Nc are the number of lines and number of columns of the image, respectively and min is the minimum function (ideally, $F(F^{-1}(r))=r$).

Figure 8:
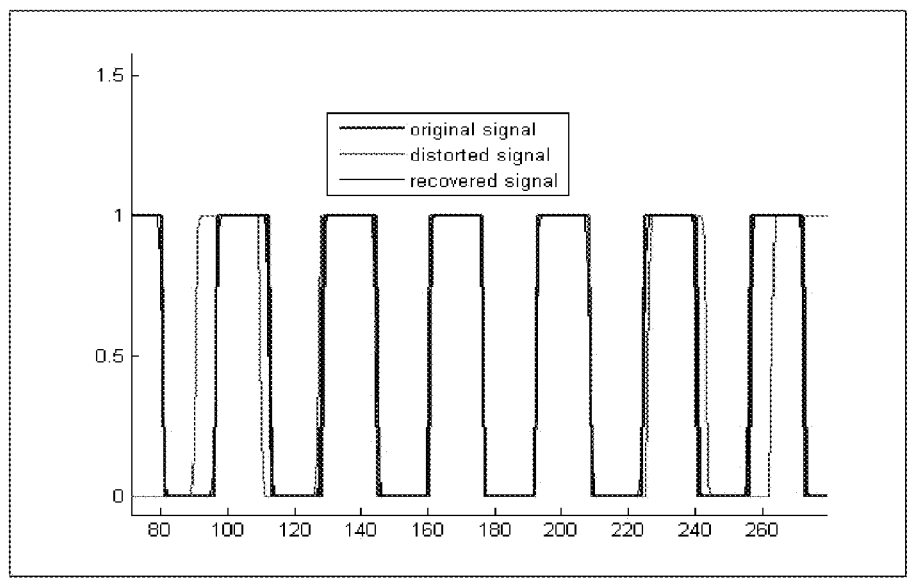
FIG. 8 illustrates an example of application of the technique of FIG. 7 and shows plots of an original signal, a distorted signal and a recovered signal that matches the period of the original signal.

A 1-D example that shows the principle of the method is illustrated in FIG. 8. A bipolar signal (in blue) is distorted starting from the middle of the signal (in red). The distorted signal has a different period towards its ends. After applying the inverse transform on the distorted signal, the recovered signal has roughly the same period with the original signal. The numerical complexity of the approach from FIG. 7 is much smaller, because it doesn't involves certain complex operations on images.

Figure 9A:
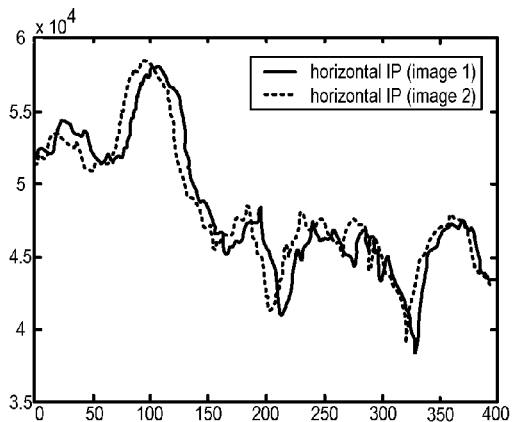
FIG. 9a illustrates examples of horizontal integral projection vectors for the images of FIGS. 6a and 6b.
Figure 9B:
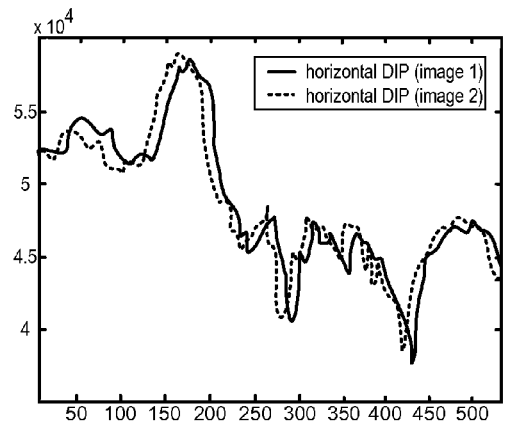
FIG. 9b illustrates examples of distorted horizontal integral projection vectors for the images of FIGS. 6a and 6b.
Figure 10A:
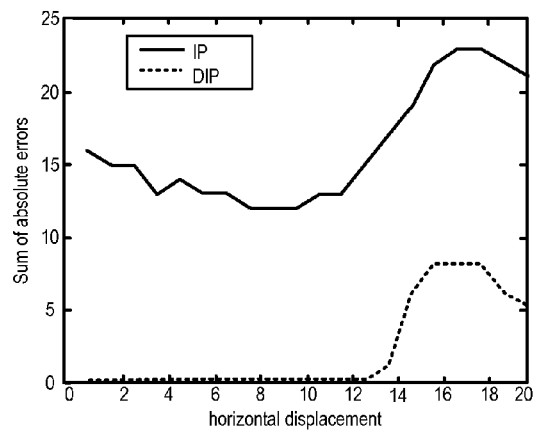
FIG. 10a illustrates examples of sums of absolute horizontal displacement errors for techniques using undistorted and distorted integral projection vectors for the pin-cushion distortion case.
Figure 10B:
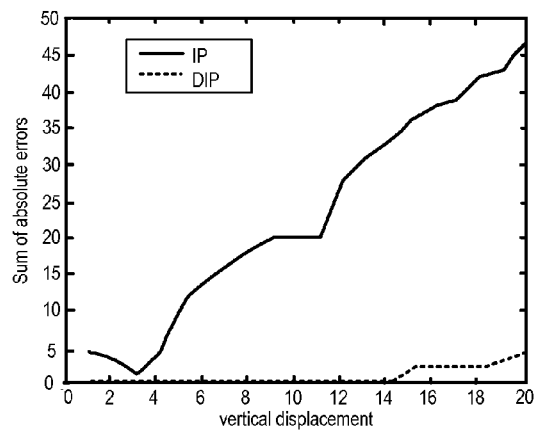
FIG. 10b illustrates examples of sums of absolute vertical displacement errors for techniques using undistorted and distorted integral projection vectors for the pin-cushion distortion case.
Figure 10C:
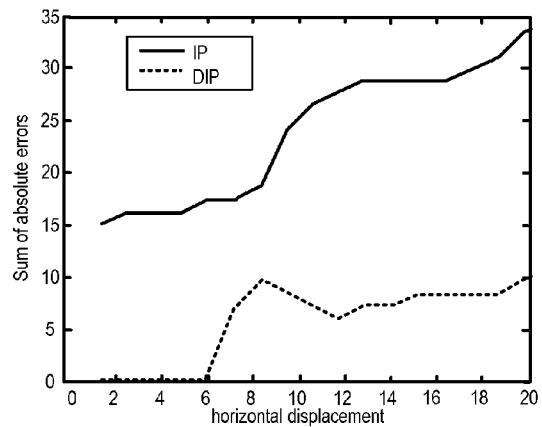
FIG. 10c illustrates examples of sums of absolute horizontal displacement errors for techniques using undistorted and distorted integral projection vectors for the barrel distortion case.
Figure 10D:
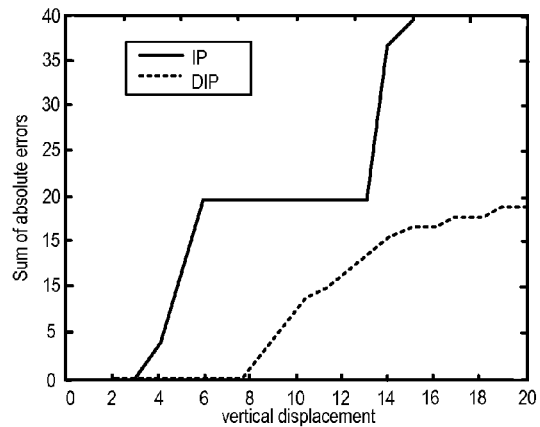
FIG. 10d illustrates examples of sums of absolute vertical displacement errors for techniques using undistorted and distorted integral projection vectors for the barrel distortion case.

In FIG. 9a the horizontal integral projection vectors of two pincushion distorted "Lena" images are plotted. The original undistorted images were translated with 10 pixels. FIG. 9b shows the horizontal Distorted Integral Projection (DIP) vectors. The methods are applied on the central part of the computed vectors. For the specific case of FIGS. 9a-9b, the integral projection order method finds a displacement of 9 pixels, while the distorted integral projection method finds the exact initial displacement of 10 pixels.

In FIGS. 10a-10d, the horizontal and vertical displacements are individually varied from 1 to 20 on distorted images (pincushion and barrel distortions). The absolute sum of errors between the exact displacements and the estimated ones using the integral projection and distorted integral projection methods is computed. The distorted integral projection method obtains a better approximation of the displacement values. As expected, the errors increase in cases of large translational values. A good approximation of the inverse of the distortion is an advantageous component of this technique. Also, better values are obtained by using shorter central parts of the distorted integral projection vectors, especially in cases of high distortions. Even more precise results are achieved in cases of polynomial and rational distortion functions with linear dependence of the radius. The largest geometrical distortion that the method can handle depends on the type of distortion, image content and the precision of the approximation of the inverse distortion function.

Implementation Mechanisms

Hardware Overview

Figure 11:
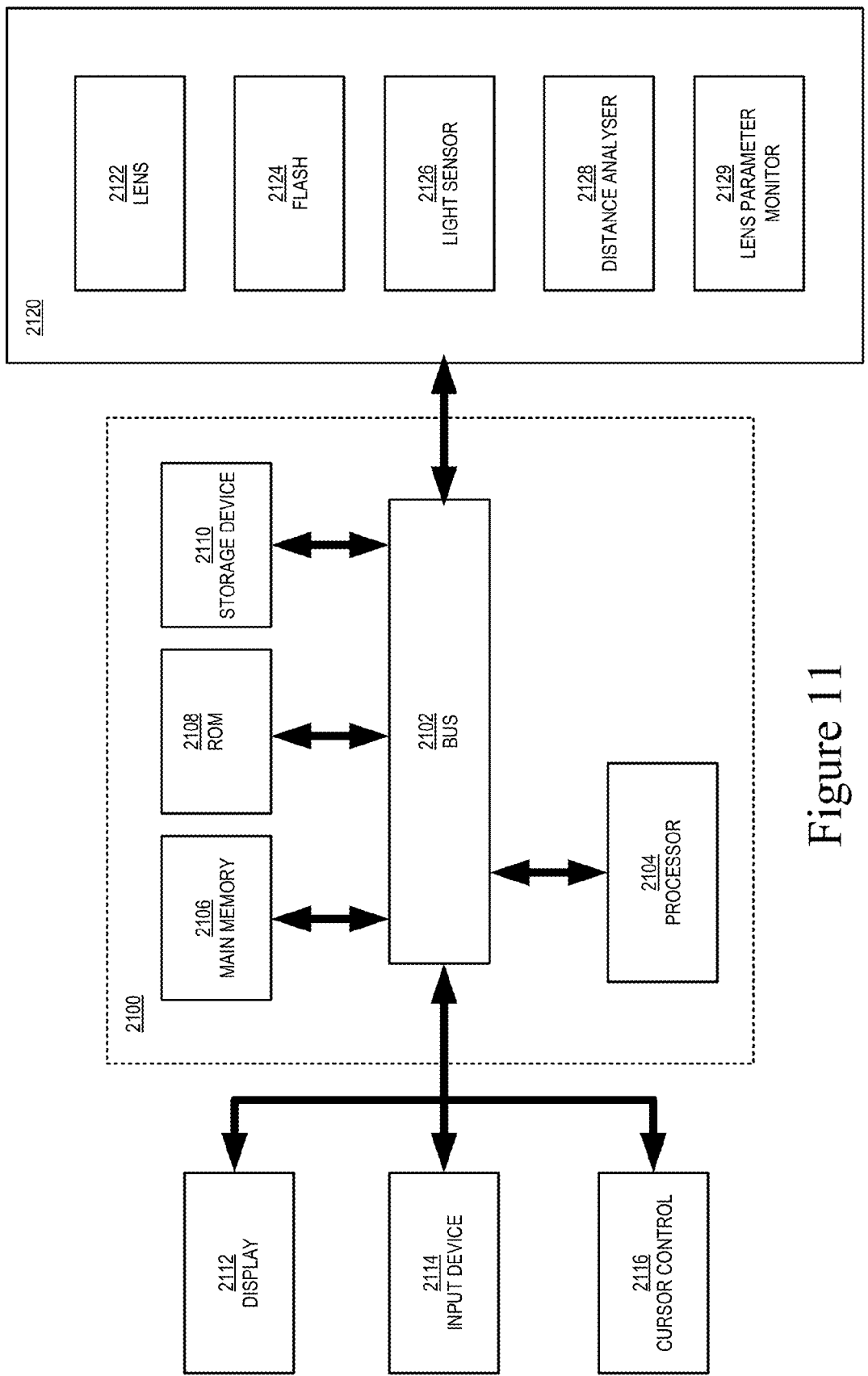
FIG. 11 is a block diagram that illustrates an image acquisition device upon which certain embodiments may be implemented.

FIG. 11 is a block diagram that illustrates an example of an image acquisition device 2100 upon which certain embodiments may be implemented. The image acquisition device 2100 can include an image capture apparatus 2120 comprising a lens 2122 and a source of light for providing illumination during image capture 2124. The image capture apparatus 2120 can further comprise distance analyzer 2128 for determining a distance between a point on the device 2100 and a subject. The image capture apparatus 2120 can further comprise a light sensor 2126 that can be, for example a CCD, CMOS or any other object that transforms light information into electronic encoding. The image capture apparatus 2120 can further comprise a mechanism 2129 for monitoring parameters of the lens 2122 during image acquisition. Relevant parameters of the lens during acquisition can include the aperture or an f-stop, which primarily determines the depth of field, the focal length which determines the enlargement of the image, and the focusing distance which determines the distance to the objects at which the lens 2122 was focused.

The image acquisition device 2100 may be contained within a single device, such as a lens connected to a personal computer, a portable camera, a smartphone, a video camera with still image capturing capability, etc. Alternatively, various portions of the image acquisition device 2100 might be distributed between multiple devices, such as having some components on a personal computer and some components on a portable digital camera. Image acquisition device 2100 includes a bus 2102 or other communication mechanism for communicating information, and a processor 2104 coupled with bus 2102 for processing information. Image acquisition device 2100 also includes a main memory 2106, such as a random access memory ("RAM") or other dynamic storage device, coupled to bus 2102 for storing information and instructions to be executed by processor 2104. Main memory 2106 also may be used for storing temporary variables or other intermediate information during execution of instructions to be executed by processor 2104. Image acquisition device 2100 further includes a read only memory ("ROM") 2108 or other static storage device coupled to bus 2102 for storing static information and instructions for processor 2104. A storage device 2110, such as a magnetic disk or optical disk, is provided and coupled to bus 2102 for storing information and instructions.

Image acquisition device 2100 may be coupled via bus 2102 to a display 2112, such as a liquid crystal display (LCD), for displaying information or images to a user. An input device 2114, including keys, is coupled to bus 2102 for communicating information and command selections to processor 2104. Other types of user input devices, for example cursor controllers 2116 such as a mouse, trackball, stylus, or cursor direction keys for communicating direction information and command selections to processor 2104 can also be used for controlling cursor movement on display 2112 for communicating information and command selections to processor 2104.

The term "computer-readable medium" as used herein refers to any medium that participates in providing instructions to processor 2104 for execution. Such a medium may take many forms, including but not limited to non-volatile media and volatile media. Non-volatile media includes, for example, optical or magnetic disks, such as storage device 2110. Volatile media includes dynamic memory, such as main memory 2106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Any single type or combination of computer-readable media can be used for storing instructions that, when executed by one or more processors, cause the processors to carry out steps corresponding to the techniques of the present invention.

Hardware Architecture of Stereo Imaging System

Figure 12:
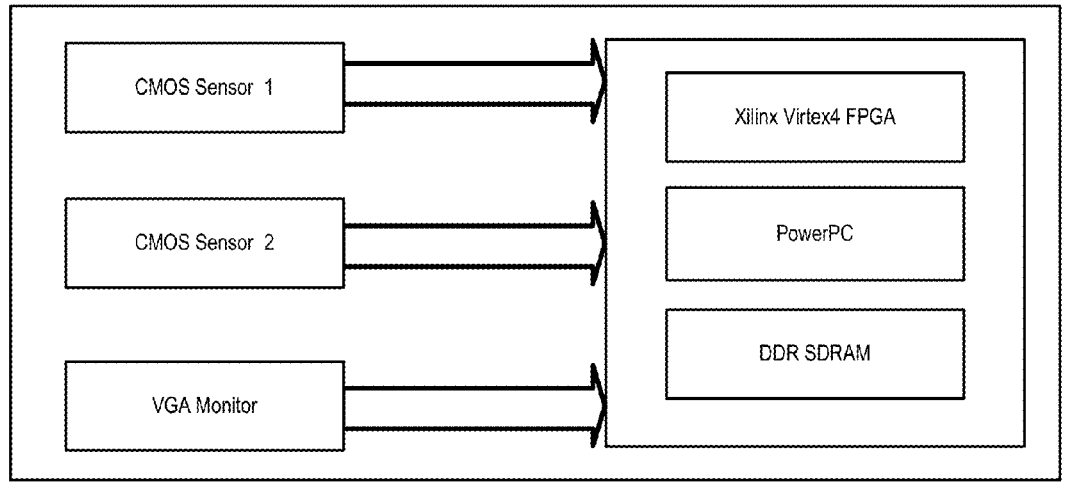
FIG. 12 illustrates an example of a general architecture of a stereo imaging system in accordance with certain embodiments.

An example of a general architecture of a stereo imaging system is illustrated at FIG. 12, which shows two CMOS sensors and a VGA monitor connected to a power PC with Xilinx Virtex4 FPGA and DDR SDRAM. The two CMOS sensors are connected to an FPGA which incorporates a PowerPC core and associated SDRAM. Additional system components can be added to implement a dual stereo image processing pipeline (see, e.g., I. Andorko and P. Corcoran, "FPGA Based Stereo Imaging System with Applications in Computer Gaming", at International IEEE Consumer Electronics Society's Games Innovations Conference 2009 (ICE-GIC 09), London, UK, incorporated by reference).

Figure 13:
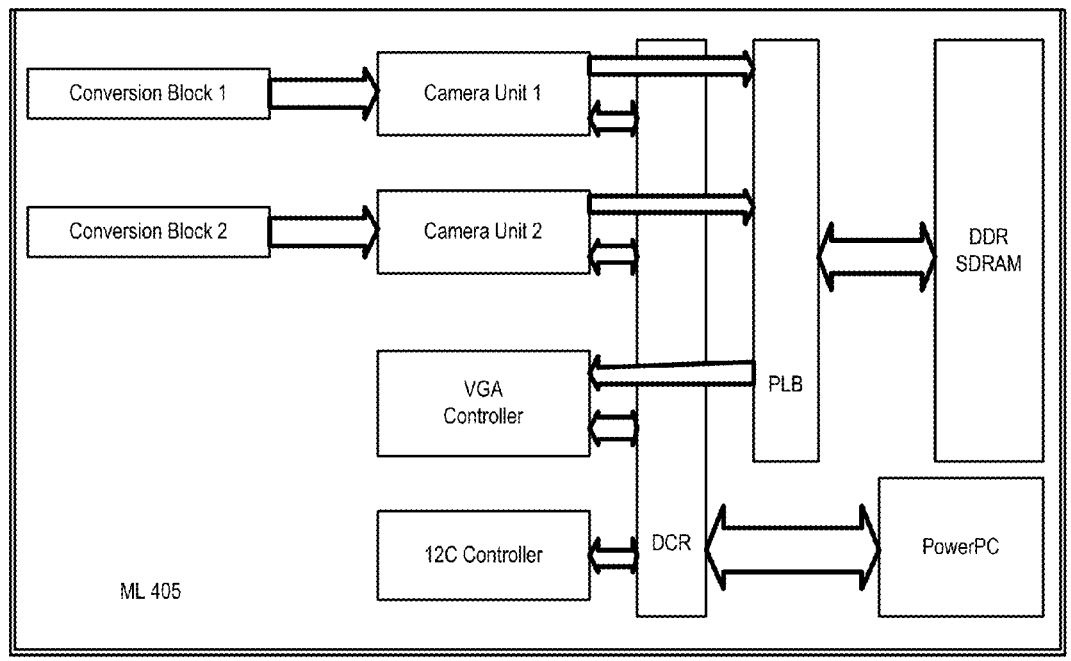
FIG. 13 illustrates an example internal architecture of a system in accordance with certain embodiments that includes two conversion blocks respectively coupled to two camera units.

The development board is a Xilinx ML405 development board, with a Virtex 4 FPGA, a 64 MB DDR SDRAM memory, and a PowerPC RISC processor. The clock frequency of the system is 100 MHz. An example internal architecture of the system in accordance with certain embodiments is illustrated at FIG. 13 which shows two conversion blocks respectively coupled to camera units 1 and 2. The camera units 1 and 2 feed a PLB that feeds a VGA controller. A DCR is connected to the camera units 1 and 2, the VGA controller, an I2C controller and a Power PC. The PLB is also coupled with DDR SDRAM. The sensor used in this embodiment includes a ⅓ inch SXGA CMOS sensor made by Micron. It has an active zone of 1280×1024 pixels. It is programmable through the I2C interface. It works at 13.9 fps and the clock frequency is 25 MHz. This sensor was selected because of its small size, low cost and the specifications of these sensors are satisfactory for this project. This system enables real-time stereo video capture with a fixed distance between the two imaging sensors.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments. In addition, features described at any of U.S. Pat. Nos. 7,660,478, 7,639,889, 7,636,486, 7,639,888, 7,697,778, 7,773,118, 7,676,108, 7,362,368, 7,692,696, 7,317,815, 7,676,108, 7,687,778, 7,606,417, 7,680,342, 7,796,822, 7,634,109, 7,787,022, 7,474,341, 7,352,394, 7,636,486, and 6,407,777, and/or United States published patent applications nos. 2008/0143854, 2010/0039525, 2009/0303342, 2009/0303343, 2009/0273685, 2009/0196466, 2008/0316328, 2009/0179998, 2009/0115915, 2009/0080713, 2009/0003708, 2009/0003661, 2009/0002514, 2008/0317379, 2008/0143854, 2008/0043121, 2011/0013044, 2011/0002545, 2009/0167893, 2008/0309769, 2008/0219581, 2009/0179999, 2007/0269108, 2008/0219581, 2008/0309770 and 2007/0296833, and U.S. patent application Ser. Nos. 12/944,701, 12/944,703, 12/901,577, 12/820,002, 12/820,034, 12/820,086, and 12/959,320, which are hereby incorporated by reference, may be used in alternative embodiments.

What is claimed is:

1. An image registration method, comprising:
   acquiring first and second distorted or partially distorted images of scenes that each include a first object;
   computing horizontal and vertical integral projection vectors for the first and second distorted or partially distorted images or distortion-corrected images, or both;
   registering the first and second distorted or partially distorted images, or the distortion-corrected images, or both, including applying a scale factor estimation between the first and second images on the horizontal and vertical integral projection vectors, including:
      resampling at least a portion of the first distorted or partially distorted image with multiple different resampling factors over a range of resampling factors to generate multiple resampled integral projection vectors;
      computing for each of the different resampling factors an absolute sum of differences, or sum of squares, between the resampled integral projection vectors of the first image and corresponding integral projection vectors of the second image; and
      determining the scaling factor between the first and second distorted or partially distorted images, including finding the resampling factor that corresponds to the minimum value of the absolute sums over the range of resampling factors; and
   performing a further action using the registered first and second distorted or partially distorted images or the corrected images, or both.

2. The method of claim 1, further comprising correcting distortion in the first and second distorted or partially distorted images prior to computing the horizontal or vertical integral projection vectors.

3. The method of claim 1, wherein the computing of the horizontal and vertical integral projection vectors comprises summing columns and rows of image data, respectively.

4. The method of claim 1, further comprising determining a distortion function for at least a portion of the first or second distorted or partially distorted image, or both, to compute said distortion-corrected images or to compute distorted integral projection vectors, or both.

5. The method of claim 4, wherein the determining a distortion function comprises finding a model function that approximately fits the distortion of at least said portion of the first or second distorted or partially distorted image, or both.

6. The method of claim 5, wherein the distortion function determined for at least said portion of the first or second distorted or partially distorted image, or both, comprises:

$$1+k_1 r; \text{ or}$$

$$[1+k_1 r]^{-1}; \text{ or}$$

$$1+k_1 r^2; \text{ or}$$

$$[1+k_1 r^2]^{-1}; \text{ or}$$

$$1+k_1 r+k_2 r^2; \text{ or}$$

$$(1+k_1 r)/(1+k_2 r^2); \text{ or}$$

combinations thereof, wherein r comprises a radial distortion function parameter and $k_1$ and $k_2$ comprise distortion function coefficients for the first or second distorted or partially distorted image, respectively.

7. The method of claim 1, wherein the first object comprises a face.

8. One or more non-transitory processor-readable media having code embedded therein for programming one or more processors to perform an image registration method, wherein the method comprises:

acquiring first and second distorted or partially distorted images of scenes that each include a first object;

computing horizontal and vertical integral projection vectors for the first and second distorted or partially distorted images or distortion-corrected images, or both;

registering the first and second distorted or partially distorted images, or the distortion-corrected images, or both, including applying a scale factor estimation between the first and second images on the horizontal and vertical integral projection vectors including:

resampling at least a portion of the first distorted or partially distorted image with multiple different resampling factors over a range of resampling factors to generate multiple resampled integral projection vectors;

computing for each of the different resampling factors an absolute sum of differences, or sum of squares, between the resampled integral projection vectors of the first image and corresponding integral projection vectors of the second image; and determining the scaling factor between the first and second distorted or partially distorted images, including finding the resampling factor that corresponds to the minimum value of the absolute sums over the range of resampling factors; and performing a further action using the registered first and second distorted or partially distorted images or the corrected images, or both.

9. The one or more non-transitory processor-readable media of claim 8, wherein the method further comprises correcting distortion in the first and second distorted or partially distorted images prior to computing the horizontal or vertical integral projection vectors.

10. The one or more non-transitory processor-readable media of claim 8, wherein the computing of the horizontal and vertical integral projection vectors comprises summing columns and rows of image data, respectively.

11. The one or more non-transitory processor-readable media of claim 8, wherein the method further comprises determining a distortion function for at least a portion of the first or second distorted or partially distorted image, or both, to compute said distortion-corrected images or to compute distorted integral projection vectors, or both.

12. The one or more non-transitory processor-readable media of claim 11, wherein the determining a distortion function comprises finding a model function that approximately fits the distortion of at least said portion of the first or second distorted or partially distorted image, or both.

13. The one or more non-transitory processor-readable media of claim 12, wherein the distortion function determined for at least said portion of the first or second distorted or partially distorted image, or both, comprises:

$1+k_1 r$; or $[1+k_1 r]^{-1}$; or $1+k_1 r^2$; or $[1+k_1 r^2]^{-1}$; or $1+k_1 r+k_2 r^2$; or $(1+k_1 r)/(1+k_2 r^2)$; or combinations thereof, wherein r comprises a radial distortion function parameter and $k_1$ and $k_2$ comprise distortion function coefficients for the first or second distorted or partially distorted image, respectively.

14. The one or more non-transitory processor-readable media of claim 8, wherein the first object comprises a face.

15. A digital image acquisition device, comprising:

a lens;

an image sensor;

a processor;

a memory having code embedded therein for programming the processor to perform an image registration method, wherein the method comprises:

acquiring first and second distorted or partially distorted images of scenes that each include a first object;

computing horizontal and vertical integral projection vectors for the first and second distorted or partially distorted images or distortion-corrected images, or both;

registering the first and second distorted or partially distorted images, or the distortion-corrected images, or both, including applying a scale factor estimation between the first and second images on the horizontal and vertical integral projection vectors, including:

resampling at least a portion of the first distorted or partially distorted image with multiple different resampling factors over a range of resampling factors to generate multiple resampled integral projection vectors;

computing for each of the different resampling factors an absolute sum of differences, or sum of squares, between the resampled integral projection vectors of the first image and corresponding integral projection vectors of the second image; and determining the scaling factor between the first and second distorted or partially distorted images, including finding the resampling factor that corresponds to the minimum value of the absolute sums over the range of resampling factors; and performing a further action using the registered first and second distorted or partially distorted images or the corrected images, or both.

16. The device of claim 15, wherein the method further comprises correcting distortion in the first and second distorted or partially distorted images prior to computing the horizontal or vertical integral projection vectors.

17. The device of claim 15, wherein the computing of the horizontal and vertical integral projection vectors comprises summing columns and rows of image data, respectively.

18. The device of claim 15, wherein the method further comprises determining a distortion function for at least a portion of the first or second distorted or partially distorted image, or both, to compute said distortion-corrected images or to compute distorted integral projection vectors, or both.

19. The device of claim 18, wherein the determining a distortion function comprises finding a model function that approximately fits the distortion of at least said portion of the first or second distorted or partially distorted image, or both.

20. The device of claim 19, wherein the distortion function determined for at least said portion of the first or second distorted or partially distorted image, or both, comprises:

$1+k_1 r$; or $[1+k_1 r]^{-1}$; or $1+k_1 r^2$; or $[1+k_1r^2]^{-1}$; or $1+k_1r+k_2r^2$; or $(1+k_1r)/(1+k_2r^2)$; or combinations thereof, wherein r comprises a radial distortion function parameter and $k_1$ and $k_2$ comprise distortion function coefficients for the first or second distorted or partially distorted image, respectively.

21. The device of claim 15, wherein the first object comprises a face.

* * * * *